United States Patent [19]

Vance, Sr.

[11] 3,860,684

[45] Jan. 14, 1975

[54] ENDLESS BELT MAKING
[75] Inventor: James C. Vance, Sr., Sedalia, Colo.
[73] Assignee: The Gates Rubber Company, Denver, Colo.
[22] Filed: Jan. 10, 1974
[21] Appl. No.: 432,366

[52] U.S. Cl. ............... 264/157, 74/233, 156/137, 156/139, 156/140, 156/250, 156/311, 264/231, 264/236, 264/297
[51] Int. Cl. ............................................ B28b 11/12
[58] Field of Search .......... 156/137, 139, 140, 282, 156/311; 264/294, 347, 236, 231, 326, 297, DIG. 59, 157, 66, 67; 425/339, 407, 383, 411, 384, 28; 74/231 R, 232, 233; 100/195, 199

[56] References Cited
UNITED STATES PATENTS

| | | | |
|---|---|---|---|
| 2,328,909 | 9/1943 | Kilborn | 264/231 |
| 2,420,278 | 5/1947 | Yelm | 264/231 |
| 2,602,188 | 7/1952 | Gorecki | 425/339 |
| 2,602,961 | 7/1952 | Spiers | 425/339 |
| 2,867,845 | 1/1959 | Sauer | 425/339 |
| 3,619,332 | 11/1971 | Bongers | 156/137 |
| 3,732,347 | 5/1973 | Hunt | 264/231 |

Primary Examiner—Charles E. Van Horn
Assistant Examiner—F. Frisenda
Attorney, Agent, or Firm—H. W. Oberg, Jr.; Raymond Fink; Curtis H. Castleman, Jr.

[57] ABSTRACT

A method of curing belt sleeves or bands of endless belts in an open-end press by partially curing a circumferential segment of the sleeve between platens of the press, incrementally advancing the sleeve a portion of the way between platens overlapping the segment and repeating the steps of partially curing and advancing the sleeve until the sleeve is effectively cured.

9 Claims, 4 Drawing Figures

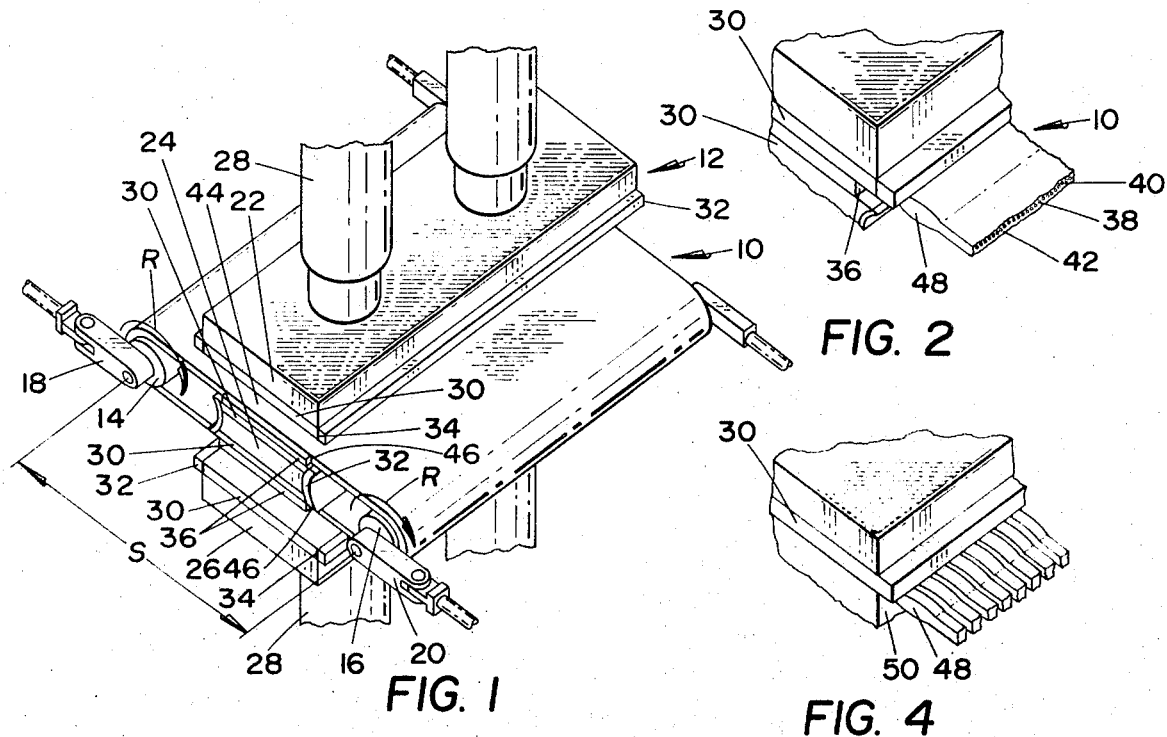
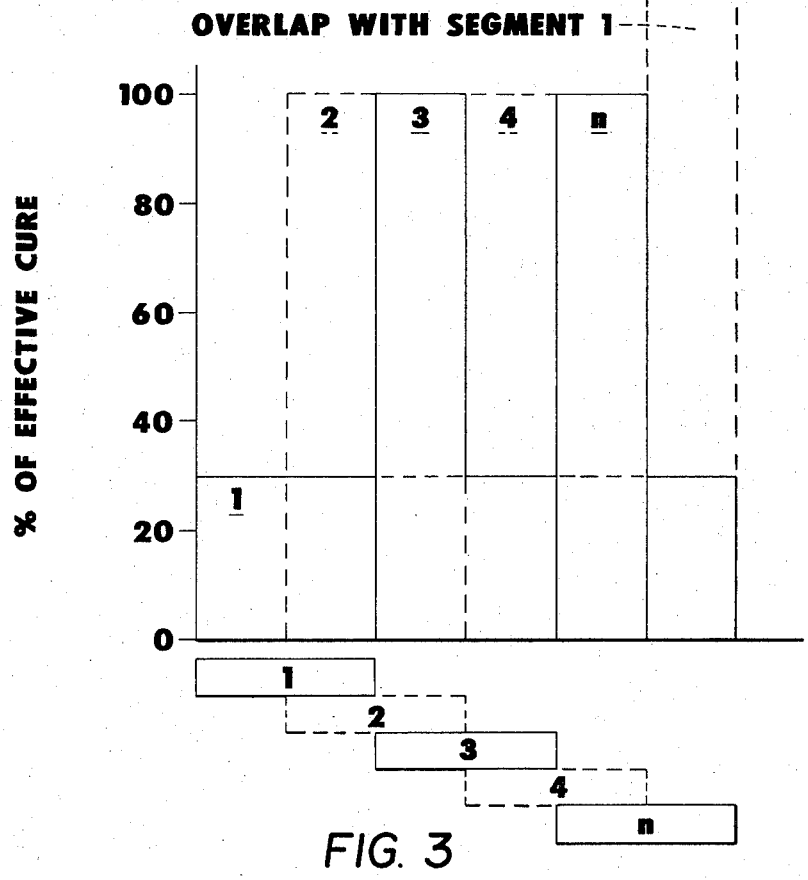

ENDLESS BELT MAKING

BACKGROUND OF THE INVENTION

The invention relates to adhesive bonding and miscellaneous chemical manufacture, but more particularly, the invention relates to flexible endless drive belt curing by molding.

Heat settable, individual endless belt bodies or endless belt sleeves, are generally molded and cured by one of three processes known to the belt making art. A "shell" mold curing process is where individual belt bodies or sleeves are placed internally within a rigid cylindrical portion of a mold. A flexible member such as a diaphragm or expansible stock is positioned internally of the individual belt bodies or belt sleeve. The expansible member defines the radial inward portion of the mold concavity. Radially outward expansion of the flexible member, with simultaneous application of heat, pressurizes the belt bodies or sleeve against the rigid outer cylindrical surface of the mold effecting molding and curing.

A "mandrel" curing technique is similar to the shell mold curing tecnhique except that the rigid and flexible portions of the mold are interchanged. The flexible diaphragm or expansible member is positioned radially outward from the rigid cylindrical member. Individual belt bands or sleeves are interpositioned between the flexible and rigid mold members. The flexible member is displaced radially inward under pressure while heat is applied to effect curing and molding of the belt bands or belt sleeve.

The "shell" and "mandrel" curing techniques are predominately used in the belt making art because they effect belt molding with a minimum number of irregularities or latent inconsistencies. In other words, the processes effect belts of high quality uniformity in terms of smooth running and long life. While these processes are preferred, the length of belt which can be cured is largely dependent upon economic factors that relate to mold size. Shell and mandrel curing become generally economically unfeasible for belt circumferences greater than fifteen feet. For the most part, the majority of belts cured by the shell and mandrel process have an effective circumference of nine feet or less. The need to cure belts of longer circumference is solved by the third most generally used molding and curing process as accomplished in an open-end press.

The press has spaced tension pulleys around which are trained uncured belt bands. A portion of each belt band is interpositioned between platens of the press which have trapezoidal concavities formed therein. The center portion of the platens are heated while the end portions of the platens are normally cooled. Pressure and heat are applied for a sufficient period of time to cure the belt bodies interpositioned between the center portion of the platens. One problem associated with an open-end press is the open-end portions of the platens. When pressure is applied to a portion of the belt bodies, a small portion of each body is usually pushed out along the longitudinal axis of the belt. The "push-out" may cause a lump in the cured belt causing rough running.

The size of the lump or "push-out" is primarily determined by two factors. The factors are: (1) uncured belt overweight and (2) curing process. In the case of overweight, excess material is pushed from the mold as the mold is closed to a fixed dimension. The open-end curing process may cure the push-out material in its extended position.

Several methods and devices have been designed to reduce the "push-out" or lumping problem. Examples of such methods and devices are taught in U.S. Pat. Nos. 2,602,188 and 2,867,845. While such molding techniques reduce the latent defects by reducing the size of the lumps or push-out which previously appeared in the belts, they have not reduced them to such a degree to make the open-end belt curing techniques comparable to either the shell or mandrel curing technique in terms of belt uniformity. Consequently, much of the industry have chosen to use either the shell or mandrel techniques to produce belts having great degrees of uniformity as measured by smooth belt operation. Because of this, the shell and mandrel curing techniques are preferably used in lieu of the open-end molding and curing techniques.

A prior art belt open-end press curing process that presently is used is exemplified by the following theoretical Chart A.

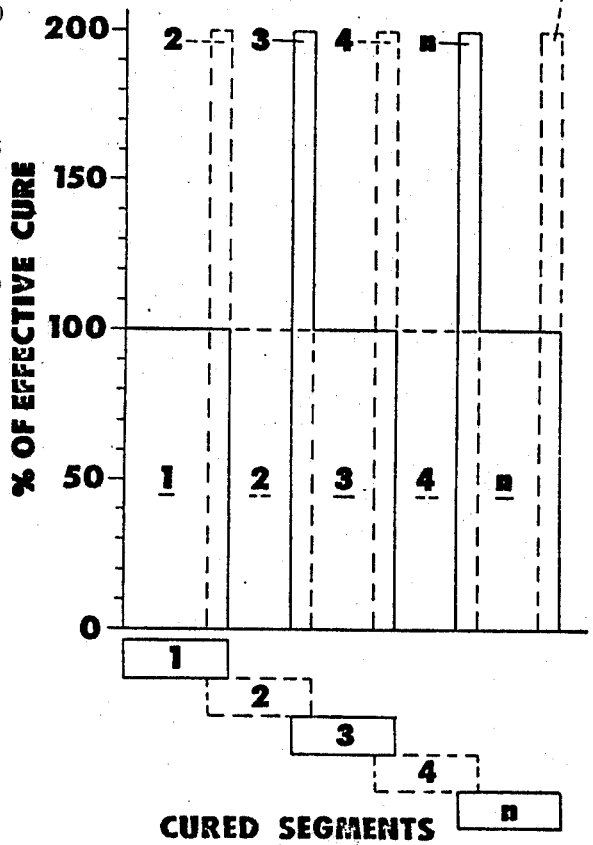

(CHART A)

The ordinate represents percentage of effective cure for any particular rubber or blend thereof, while the abscissa represents lengths of belt segments as cured between platens of an open-end press. Successive cure cycles are alternately represented by solid and dotted lines. "Push-out," when it occurs, is along the edge of each belt segment which corresponds to the vertical lines of the above chart. No consideration is shown for a temperature gradient along the vertical cure lines. In reality, the vertical lines should be sloped.

Referring to the chart, the first belt segment initially receives a full or 100 percent effective cure. During the cure, a portion of rubber, under pressure and at a transient condition of minimum viscosity associated with its thermoplasticity, is displaced to the open-ends of the mold forming a "push-out." The belt is advanced such that segment 2 partially overlaps segment 1, as shown schematically along the abscissa. When heat and pressure are applied, a portion of the segments are exposed to an over-cure. The advancing, overlapping, and curing of the belt are repeated until the $n$th step where the belt is completely cured and where the $n$th step partially overlaps the initial curing step. Thus, it is seen that push-out, if it exists, is adjacent a full or 200 percent cure step where it is possible for the push-out to be partially cured to an unsatisfactory remoldable state.

A second type of curing method which has been used, but is not preferred primarily because it takes 2 to 3 times as long as the full-step cure process discussed above, is known as a partial-step cure. The curing cycle may be theoretically illustrated by the following Chart B.

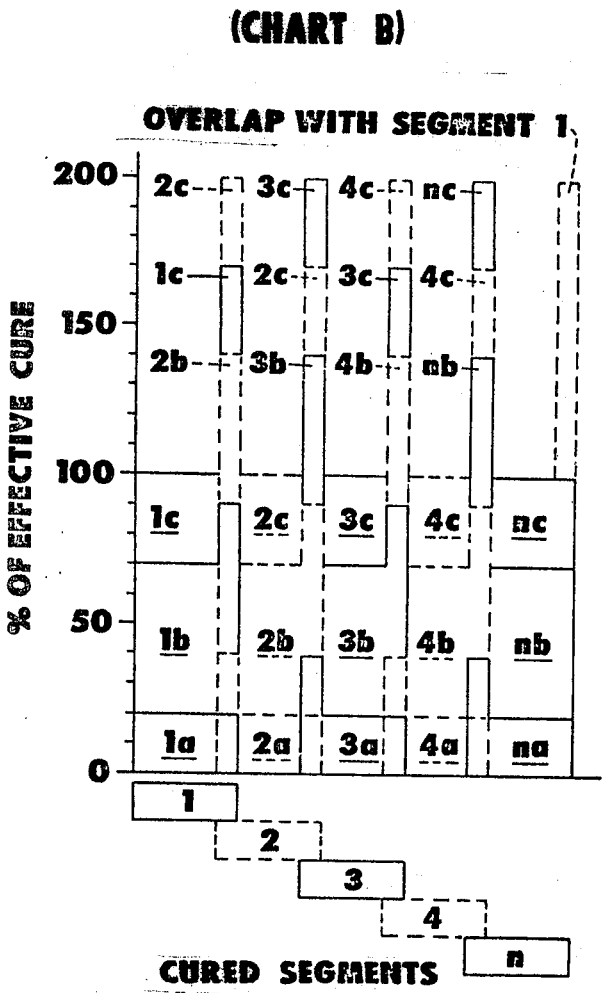

(CHART B)

As shown in Chart B, the first belt segment is partially cured, subscript $a$, to a desired level, as for example 20 percent. The belt is advanced to segment 2 and successive segments in a manner as explained in reference to Chart A. A higher state of cure occurs at each segment overlap. After the entire belt receives a partial state of cure, the second cure cycle is then started. In Chart B, it is assumed the second portion of the curing cycle, subscript $b$, exactly overlaps the first cycle to illustrate a maximum or worst curing condition. After a second additional partial cure of 50 percent, it is seen that the stepped area may be cured to 140 percent ($b$). A third and additional curing cycle of 30 percent cures the major portion of the belt to 100 percent but some segments may be cured as high as 200 percent. Here again, when push-out is formed, it occurs adjacent the platens as represented by the vertical cure lines of the chart. It is possible to have the "push-out" at a very high state of cure which can essentially preclude remolding of the "push-out". Also, the partial curing of the entire belt for each phase of the complete curing process requires that the belt be rotated several times between the platens. While the percent cure of each cycle and the number of cycles may be varied as desired, each extra rotation of the belt results in an economic expense over the full segment curing cycle discussed in reference to Chart A.

However, the open-end type curing process offers certain advantages over the shell and mandrel curing techniques. The primary advantage of the open-end process is that it allows belts of different lengths, widths, and thickness, to be cured and molded on the same equipment. Also, the open-end press inherently permits high pressures (300–700 + psi) to be applied to a belt sleeve or body. Comparatively, both the shell and mandrel techniques require large changes in the mold construction or dimensioning to accommodate changes in diameter, width, or thickness. Such changes are a severe economic penalty when the multitude of belt sizes and shapes necessary for competition in a highly developed and integrated marketplace are considered. Nevertheless, the shell and mandrel curing techniques are preferred and presently used where possible instead of the open-end curing technique to produce belts having high degrees of uniformity that is demanded in todays marketplace.

Another curing technique used in the belt processing art is known as "roto-cure". In this process, a belt is trained under tension around a drum or roller. A mangle or flexible steel band is positioned concentric with and radially spaced from the drum. The mangle or band is used to apply temperature and pressure to the belt as it is continuously rotated and sandwiched between the drum and band. A problem associated with the technique is that only low pressures (50–90 + psi) are applied to the belt during cure. Also, the radial dimension between the drum and band may vary while the belt is rotated which introduces dimension irregularities in the belt. Such irregularities and low pressures result in poor belt performance in terms of life and smoothness.

SUMMARY OF THE INVENTION

The invention relates to improvements in openneck press curing techniques. The process of the invention effects production of both long and short belts having uniformity that approaches or equals belts produced by the mandrel and shell cure molding techniques. An open-end type press is used wherein a portion of a belt sleeve or individual belt bodies are interpositioned between platens of the press. The center portion of the platens are heated while the end portions of the platens are cooled. A belt sleeve or individual belt bodies are heated for a period of time to effect partial curing of the composite polymers of the belt sleeve or body. Before total curing has occurred, the belt sleeve or bodies are advanced a portion of the way between the press platens. The process steps are incrementally repeated until the belt polymer leaving the press has been effectively cured.

A primary object of the invention is to produce endless belts with an improved open-end type curing and molding technique such that the belts so cured have a degree of uniformity and performance that was previously associated with belts produced by shell or mandrel mold curing techniques.

Another object of the invention is to provide a process for curing belt sleeves using an open-end type curing press.

A salient object of the invention is to provide a process for curing belt sleeves or belt bodies which has a minimum deleterious effect on the physic and physical environment of an operator.

A primary advantage of the invention is economic. A single open-end type press can be used to effect molding and curing of a multitude of belt lengths and widths.

Another advantage of the open-end type press process is that a higher and more consistent pressure may be applied to belt bodies or sleeves while curing than is normally achieved in either a mandrel or shell cure process.

These and other objects or advantages of this invention will be readily understood by reviewing the drawings and description thereof wherein:

FIG. 1 is a perspective view of belt molding apparatus with a belt sleeve portion interpositioned between platens thereof.

FIG. 2 is a perspective view showing a portion of a belt sleeve being cured in accordance with the process of this invention.

FIG. 3 is a graphic illustration showing effective curing for an example belt sleeve in accordance with the process of this invention.

FIG. 4 is a perspective view similar to FIG. 1 but showing a plurality of belt bodies positioned in molding apparatus.

DESCRIPTION OF PREFERRED EMBODIMENTS

In accordance with the process of the invention, belt sleeves 10 are cured utilizing a press 12 of the open-end type. Referring to FIG. 1, an endless belt sleeve 10 is trained around two essentially parallel rollers 14, 16 of an open-end press. The spacings between the rollers is adjustable to accommodate several belt sleeve lengths. One end support 18, 20 for each roller is selectively removable to facilitate installation and removal of the belt sleeve.

The press 12 typically includes three platens 22, 24, 26. The center platen 24 is cantilevered and stationary while the upper 22 and lower 26 platens are reciprocally movable by means such as hydraulic cylinders 28. Only a one-sided or stationary platen and one movable platen are required; however, three platens are normally used as it signficantly reduces curing time as two portions of a sleeve may be cured simultaneously.

Mold members 30 are removably attached to each of the press platens. In the case of curing an endless belt sleeve, generally planar mold members are used. The planar mold members may include a matrix for molding a desired shape into the exterior surfaces of the sleeve.

The center portions of the mold are heated by means such as circulating hot water, steam, or electrical energy while the end portions 32 of the molds are cooled by means of a coolant such as circulating water or refrigerant. An insulator 34 separates the heated and cooled portions of the molds. Spacing blocks 36 precisely maintain a predetermined dimension between the stationary 24 and movable 22, 26 members of the mold when belt sleeves are to be cured. Preferably, the spacing blocks 36 are selectively removable to accommodate a variety of belt sleeve thicknesses.

The belt sleeve is fabricated by known methods and may include a tensile section 38, belt overcord 40, and belt undercord 42. The undercord 42 and overcord 40 is of any desired polymeric material such as the natural rubbers, synthetic rubbers, or blends thereof, and may include reinforcements such as fibers or cross-cords. The process of the invention allows for a variety of tensile sections to be used. The tensile section may be extensible and of a material such as polyester, nylon, rayon, or the like; or the tensile section may be of substantially inextensible material such as wire cable, fiber glass or a textile sold under the trade name Fiber B (Kevlar) by duPont. Belt sleeves may be fabricated in the inverted position where the tensile section is radially inward or in the upright condition where the tensile section is radially outward of the sleeve. A primary advantage of the invention permits center-line cord belts to be produced with a high degree of performance as measured in terms of uniformity, long life, and low cost.

Means, not shown, are provided for rotating the rollers of the press a selective amount. The means may be manual but are preferably automatically driven by a synchronous system such as electric or hydraulic motors. Also, it is preferred that an incremental rotation of the rollers generally correspond to a fractional length of the mold. In other words, the arc defined by an angular advancement of a roller is preferably some fraction of the mold length.

Heat curable rubbers used in belt manufacture have a variety of characteristics. Rubbers may be compounded to effect varying degrees of hardness, extensibility, and chemical resistance. The types of rubber used in any particular belt application will normally reflect its intended use. While the different rubber compounds have different physical characteristics, all rubbers have a common basic characteristic. The rubbers are molded to a desired shape under the influence of pressure, temperature and time. The period of time and amount of heat involved will of course vary from rubber to rubber. If heat is applied for too little a time period, the rubber will be "undercured" whereas if heat is applied for too long or at too high of a temperature, the rubber will be overcured. A rubber that has been partially cured may be reheated to effect complete curing. However, the remoldability of a partially cured rubber may be seriously affected by the degree of previous cure.

If a completely cured rubber section is placed adjacent an uncured rubber section and the rubbers heated to effect cure, there will be very little, if any, linking of the polymer chains between the rubber sections. Comparatively, if a partially cured rubber is placed adjacent an uncured piece of rubber and the rubbers heated to effect cure strong linkings of the polymer chains between the rubbers will be effected. For this reason, it is most important to consider the characteristics of a rubber product as it is being cured. When a shell or mandrel mold curing process is used as above discussed, partially curing of a product while molding is relatively unimportant as the entire mass of the rubber article receives the same degree of heat and generally the same degree of pressure for substantially the same period of time. However, when an open-end type curing process is used, all portions of the belt sleeve are not heated and pressurized simultaneously. Hence, the problem associated with cured and partially cured rubber is manifest in an open-end press curing process.

A common chart used for depicting rubber characteristics is a rheograph. Referring to Chart C, a rheograph is shown for a general rubber used in belt making. The chart depicts the torque imposed by the rubber against a turning wheel as a function of time as the rubber is heated. The curve is of general S shape. The first portion of the curve indicates initial viscosity ($a$) while the lowest portion ($b$) represents the thermoplasticity of the rubber. It is during the thermoplastic state that a major portion of rubber molding takes place. Once cross-linking starts to occur within the rubber, resistant torque increases. Moldability of the rubber is impaired as the viscosity increases ($c$) as indicated by the vertical portion of the curve. The above-known rubber characteristics are reiterated here to emphasize the importance of this invention.

(CHART C)

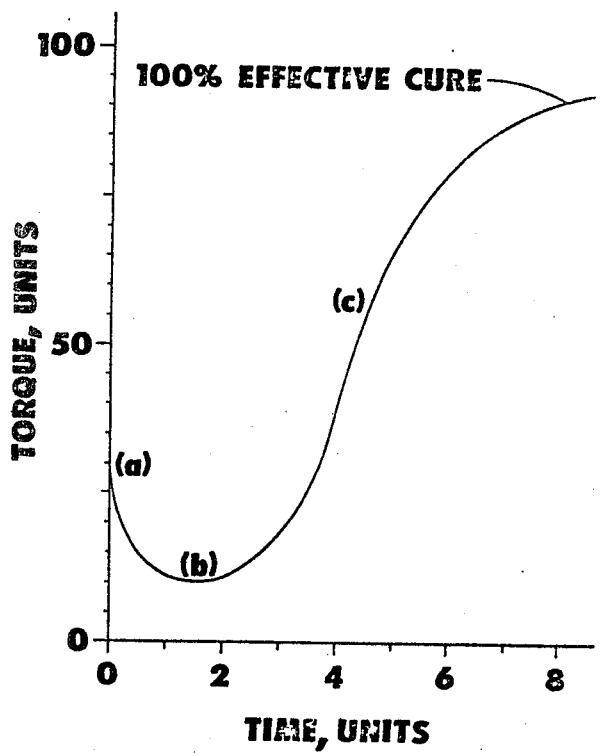

When a belt sleeve is cured in accordance with the process of the invention, it is supported at spaced points on its inner periphery by two rollers 14, 16. Circumferential portions 44, 46 of the sleeve 10 extend between open platens 22, 24, 26 of the press. Preferably, two movable and one stationary platens are used to cure two circumferential portions of the sleeve simultaneously for production efficiency. One circumferential portion of the belt may be cured at a time without departing from the scope of the invention.

Heat is applied to the mold portions 30 bringing them to a predetermined temperature which corresponds to a curing temperature for rubber which generally ranges from 300° to 350°F. The end portions 34 of the mold are insulated from the mold portions 30 and are chilled to a temperature well below rubber curing temperatures. The end portions 32 may be chilled to or below room temperatures of 77°F. or less by means of circulating water or refrigerant.

Pressure and heat are applied to one or more initial circumferential segments of the sleeve. The pressure and heat mold the initial segment to a predetermined thickness as established by parallel spacer blocks 36 which define the sides of the mold. A 10 percent compression of the sleeve is generally allowed to generate a pressure within the sleeve of 300 to 700 psi. The spacer blocks are removable to accommodate a plurality of sleeve thickness or to control the pressure generated in the rubber belt sleeve by the platens.

The initial sleeve segment is partially cured in the molded position by application of heat from the mold. The belt sleeve adjacent to the segment positioned in the mold is precluded from reaching an advanced state of cure because of the partial cure and the cooled end portions 32. Partial curing is controlled by an elapsed time period once a cure temperature is selected.

The platens 22, 26 are opened and the sleeve 10 is rotated R by the rollers 14, 16 placing a successive circumferential segment of the sleeve 10 in the mold. The successive segment overlaps at least one-half of the initial segment. In other words, half or more of the initial segment is retained in the mold. Preferably, the platens are opened and the sleeve is advanced automatically in a minimum time period to preclude that portion of the initial segment remaining in the mold from cooling any appreciable amount. This assures maintaining a controlled degree of cure for the segment by avoiding uncertainties in the time necessary to heat the sleeve to a temperature at which curing is initiated. The time necessary to heat the rubber sleeve to the initiating cure temperature is sometimes referred to as thermal response.

Pressure and heat are applied to successive segments of the sleeve in the manner above described. The time period that a segment is in the mold is correlated to the number of overlaps each segment experiences. The times are correlated such that the last portion of a sleeve segment leaving the mold is always 100 percent effectively cured. Except for the initial segment, the portions of the sleeve exiting the mold are generally 100 percent effectively cured.

Successive segments are repeatedly introduced into the mold for curing until such time that the uncured portion of the initial segment is again introduced into the mold for curing. Some overlap of the initial segment occurs which results in an overcure. When a two-part mold is used, the sleeve must be rotated generally one turn whereas when a three-part mold is used, i.e., two movable and one satisfactory platen, generally one-half turn is required.

In reviewing the process, it is seen that push-out 48, should it occur, is adjacent a portion of the sleeve which is only partially cured. This precludes the probability of curing the push-out to an unremoldable state. It is believed that this is instrumental in making smooth running belts.

Once the sleeve is completely cured, the platens are opend and the sleeve is removed. However, when a heat shrinkable tensile section such as polyester cords are used, the sleeve is normalized by rotating the rollers 14, 16 while cooling. The normalizing process assures the production belts having exact circumferences.

The effect of curing the belt sleeve is incremental amounts is pictorially represented by FIG. 3. For purpose of illustration and not limitation, FIG. 3 reflects a cure cycle where the belt sleeve is incrementally advanced approximately one-half the distance of the effective mold curing width. During the curing process, the preheated platens are closed which applies pressure and temperature to the initial sleeve segment. Heat and pressure are applied to initial segment 1 for from generally 4 to 30 minutes depending on sleeve thickness and cure temperature, afterwards, the platens are opened and the belt sleeve advanced to a successive or second segment 2. Segment 2 overlaps preceding segment 1 when the preheated platens are again closed. Heat and pressure are applied for generally the same time period as the initial segment which cures the trailing portion of segment 1 to a 100 percent effective cure and the trailing portion of segment 2 to, for example, 30 percent. The process is repeated and each successive segment undergoes first a 30 and then 100 percent effective cure. It is seen from Chart C that a rubber material is still in a moldable state at 30 percent cure and that any push-outs adjacent the end portions of the mold may be easily remolded as there has been no high degree of cure associated therewith. With the exception of the first segment, no portion of the belt receives more than 100 percent cure. However, this occurs adjacent a portion of belt that is only 30 percent cured and still moldable. This also minimizes the probability of overcuring the belt while also overcuring belt segments adjacent end portions of the mold. The curing steps are repeated until the last successive segment overlaps a first segment to effect total cure.

After the sleeve is completely cured, it is cut into V-belts by known cutting processes. In an attempt to compare the effectiveness of the process of the invention, belt sleeves with the same construction were fabricated and cured in accordance with the invention; the shell mold of curing process; the mandrel curing process; and the prior art open-end curing process. A plurality of belts were then cut from each group and subjected to accelerated tests to generally 300 life hours following generally SAE test procedures. The lives of the belts were compared by using the prior art methods as the base or 100 percent reference.

TABLE

| Prior Art | Shell Cure | Shell Cure | Mandrel Cure | Open-end Press Cure |
| --- | --- | --- | --- | --- |
| This Invention | 189% | 140% | 191 | 100% |

It is seen in the Table that belts built in accordance with the invention had lives greater than those cured by the shell and mandrel curing processes. The belts of the invention had a smoothness which correlated to the shell and mandrel mold curing techniques. On the other hand, the belts have a life corresponding to the life of an open-end type cure process. Summarily, the process of the invention affords belts having the smooth running characteristics of the mandrel and shell mold curing techniques and the long life of the open-end curing techniques.

Perhaps the greatest advantage of the invention is realized when a belt sleeve is built with a tensile section or cord line in the center. The belt sleeve is fabricated using known arts and methods where additional reinforcement is placed above and below the tensile section. The sleeve is cured in accordance with the process of the invention as above set forth which includes cutting the belts into trapezoidal cross-sections. Since the belt sleeve is cured in a flat position, it has no memory of curvature as results from using either a mandrel or shell mold curing technique. The belts may be cut side-by-side where every other belt is afterward inverted. There is no loss from cutting as adjacent belts cut from a sleeve are contiguous with one another. The belts are uniform because of the step cure process as above explained. The belts are very smooth running. Such a smooth running belt could not be built in either the mandrel or mold cure process because of the memory of the inverted sections and the flexible diaphgragm placed adjacent either the inner or outer belt sleeve surfaces. Also an open-end normal curing process would not be effective because of the push-out and lumping problem which results. Thus, the process of the invention provides a method for making a new and improved belt.

ADDITIONAL SPECIES

The process of the invention as above described in reference to curing a sleeve. The process may also be used to cure individual belt bodies as shown in FIG. 4. The bodies are individually cut from an uncured sleeve prior to molding. Also, the platens of the press are changed to a mold 50 having a plurality of trapezoidal cavities.

The foregoing description is made for purposes of illustration only and is not intended to limit the scope of the invention which is to be determined by the appended claims.

What is claimed is:

1. A method for curing a power transmission belt sleeve in an open ended press comprising the steps of:
    supporting the sleeve at spaced points on its inner periphery;
    moving the supporting points apart tensioning the belt sleeve;
    pressurizing and heating at least one circumferential initial segment of the sleeve while simultaneously molding the initial segment to a predetermined thickness and cooling the belt sleeve adjacent the initial segment;
    partially curing the initial segment;
    pressurizing and heating successive circumferential segments of the sleeve while simultaneously molding the segments to the thickness and cooling the sleeve adjacent each segment, each successive segment overlapping at least half of its preceding segment;

incrementally curing the successive segments, each successive segment receiving generally a 100 percent effective cure after complete overlapping by successive segments;

pressurizing and heating at least a portion of the initial segment by overlapping with at least one of the successive segments, while simultaneously molding the successive segments to the thickness and cooling the sleeve adjacent the successive segments; and incrementally curing the initial segment, in conjunction with the overlapping successive segments effecting at least a 100 percent cure of the initial segment.

2. A method as set forth in claim 1 and further including the steps of: dividing the sleeve into a plurality of generally equal circumferential lengths and overlapping the initial and successive segments generally equal fractional amounts of the generally equal circumferential length.

3. A method as set forth in claim 1 including moving the supporting points apart to a predetermined length prior to the step of pressurizing and heating the initial segment.

4. A method as set forth in claim 1 including cooling the belt sleeve while rotating it about the supporting points.

5. A method for curing a power transmission belt in an open-ended press comprising the steps of:

supporting the belt at spaced points on its inner periphery;

moving the supporting points apart tensioning the belt;

pressurizing and heating at least one cirumferential initial segment of the belt while simultaneously molding the initial segment to a predetermined shape and cooling the belt adjacent the initial segment;

partially curing the initial segment;

pressurizing and heating successive circumferential segments of the belt while simultaneously molding the segments to the thickness and cooling the belt adjacent each segment, each successive segment overlapping at least half of its preceding segment;

incrementally curing the successive segments, each successive segment receiving generally a 100 percent effective cure after complete overlapping by successive segments;

pressurizing and heating at least a portion of the initial segment by overlapping with at least one of the successive segments, while simultaneously molding the successive segments to the thickness and cooling the belt adjacent the successive segments; and incrementally curing the initial segment, in conjunction with the overlapping successive segments effecting at least a 100 percent cure of the initial segment.

6. A method as set forth in claim 5 and further including the steps of: dividing the sleeve into a plurality of generally equal circumferential lengths and overlapping the initial and successive segments generally equal fractional amounts of the generally equal circumferential length.

7. A method as set forth in claim 3 including moving the supporting points apart to a predetermined length prior to the step of pressurizing and heating the initial segment.

8. A method as set forth in claim 5 including cooling the belt sleeve while rotating it about the supporting points.

9. In a method for curing belt sleeves of the type having the process steps of supporting a sleeve at spaced points on its inner periphery, tensioning the sleeve by moving the supports apart, and curing circumferential portions of the sleeve, the improvement in curing the circumferential portions of the sleeve comprising the steps of:

pressurizing and heating at least one circumferential initial segment of the sleeve while simultaneously molding the initial segment to a predetermined thickness and cooling the belt sleeve adjacent the initial segment;

partially curing the initial segment;

pressurizing and heating successive circumferential segments of the sleeve while simultaneously molding the segments to the thickness and cooling the sleeve adjacent each segment, each successive segment overlapping at least half of its preceeding segment;

incrementally curing the successive segments, each successive segment receiving generally a 100 percent effective cure after complete overlapping by successive segments;

pressurizing and heating at least a portion of the initial segment by overlapping with at least one of the successive segments, while simultaneously molding the successive segments to the thickness and cooling the sleeve adjacent the successive segments; and incrementally curing the initial segment, in conjunction with the overlapping successive segments effecting at least a 100 percent cure of the initial segment.

* * * * *